US007289520B2

United States Patent
Xu et al.

(10) Patent No.: US 7,289,520 B2
(45) Date of Patent: Oct. 30, 2007

(54) METHOD, APPARATUS, AND SYSTEM FOR EXPRESSWAY ROUTING AMONG PEERS

(75) Inventors: Zhichen Xu, Sunnyvale, CA (US); Zheng Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1163 days.

(21) Appl. No.: 10/299,907

(22) Filed: Nov. 20, 2002

(65) Prior Publication Data

US 2004/0098502 A1    May 20, 2004

(51) Int. Cl.
*H04L 12/28* (2006.01)
*H04L 5/14* (2006.01)
*G06F 15/173* (2006.01)

(52) U.S. Cl. ............... 370/400; 370/255; 709/238
(58) Field of Classification Search ............ None
See application file for complete search history.

(56) References Cited

U.S. PATENT DOCUMENTS

| | | | |
|---|---|---|---|
| 5,596,719 A * | 1/1997 | Ramakrishnan et al. | 709/241 |
| 6,304,556 B1 * | 10/2001 | Haas | 370/254 |
| 6,347,078 B1 * | 2/2002 | Narvaez-Guarnieri et al. | 370/230 |
| 6,980,524 B1 * | 12/2005 | Lu et al. | 370/254 |
| 6,981,055 B1 * | 12/2005 | Ahuja et al. | 709/238 |
| 7,002,917 B1 * | 2/2006 | Saleh | 370/238 |
| 2002/0103903 A1 | 8/2002 | Bruton et al. | |
| 2002/0191584 A1 | 12/2002 | Korus et al. | |
| 2003/0033394 A1 | 2/2003 | Stine | |
| 2004/0042403 A1 * | 3/2004 | Xu et al. | 370/238 |
| 2004/0054807 A1 * | 3/2004 | Harvey et al. | 709/243 |
| 2004/0103211 A1 * | 5/2004 | Jackson et al. | 709/244 |

OTHER PUBLICATIONS

Ratnasamy S. et al., "A Scalable Content-Addressable Network", Aug. 27-30, 2001, ACM 1-58113-411/8/01/0008, p. 161-172.
Ratnasamy S. et al., "A Scalable Content-Addressable Network", Oct. 10, 2000, p. 1-16.
Hyperdictionary, definition of SPAN, http://www.hyperdictionary.com/search.aspx?define=span, downloaded Jul. 2, 2007.

* cited by examiner

*Primary Examiner*—Kwang Bin Yao
*Assistant Examiner*—Warner Wong

(57) ABSTRACT

In a method for creating expressway for overlay routing, an existing peer-to-peer network is organized into a plurality of zones. A neighboring zone to a destination peer is selected. A plurality of residents of the neighboring zone are retrieved. A candidate peer is selected from the plurality of residents based a physical distance value and an estimated distance value.

21 Claims, 10 Drawing Sheets

| ROUTING LEVEL | ZONE | NEIGHBORING ZONES | RESIDENTS |
|---|---|---|---|
| $R_0$ | $R_0Z$ | $(R_0N_{1L}, R_0N_{1U})... (R_0N_{DL}, R_0N_{DU})$ | A, D, F... |
| $R_1$ | $R_1Z$ | $(R_1N_{1L}, R_1N_{1U})... (R_1N_{1L}, R_1N_{1U})$ | A, D, G |
| ... | ... | ... | ... |
| $R_L$ | $R_LZ$ | $(R_1N_{1L}, R_1N_{1U})... (R_1N_{1L}, R_1N_{1U})$ | A |

FIG. 4

METHOD, APPARATUS, AND SYSTEM FOR EXPRESSWAY ROUTING AMONG PEERS

CROSS-REFERENCES

The present application is related to currently pending:

U.S. application Ser. No. 10/231,184, filed on Aug. 29, 2002, and entitled "EXPRESSWAY ROUTING AMONG PEERS", by Xu et al.; and U.S. Application Ser. No. 10/237,618, filed on Sep. 10, 2002, and entitled "CREATING EXPRESSWAYS FOR OVERLAY ROUTING" BY Zheng et al., which are assigned to the assignee and are incorporated by reference herein in their entirety.

FIELD

This invention relates generally to network systems. More particularly, the invention relates to expressway routing among peers.

DESCRIPTION OF THE RELATED ART

Peer-to peer (P2P) systems represent a class of networks that utilize distributed resources and perform critical functions in a decentralized manner. Compared with traditional client/server systems, P2P systems have advantages such as improved scalability and reliability, elimination of hot spots surrounding big servers, better resource utilization, lower cost of ownership, etc.

Although P2P may indicate a shift in general purpose computing, the early generation of P2P systems were typically limited to information placement and look-up. One drawback and disadvantage of the earlier P2P systems is they could not guarantee information location for requesting applications. For instance, early P2P systems (e.g., Gnutella and Freenet) searched for a requested object, i.e., requested information, by looking for cached copies via flooding (they use heuristics to reduce the number of nodes that have to be flooded). As a result, the search may fail because the cached copies may not exist even when the requested object exists.

Accordingly, later generations of P2P systems dictated a consistent mapping between an object key to a hosting node. In these systems, an object can always be retrieved as long as a hosting node can be reached. The random generation of node identifications and document keys allow even distribution of the data objects among the hosting nodes. Nodes in these later generation P2P systems comprise an overlay network. Since there is a consistent binding between objects to nodes, locating an object is reduced to the problem of routing to the destination node from the requesting node of where the query is submitted.

However, these later generation P2P systems also have disadvantages and drawbacks. As an example, the overlay network of the later generation P2P systems had limited capability to take advantage of the heterogeneity (e.g., storage capacity, packet forward capacity, network capacity, etc.) of their underlying network. More particularly, the overlay network of the later generation P2P systems were typically homogeneously constructed over the underlying network. Typically, the overlay network was constructed with network proximity as a guide. As a result, the physical topology of the overlay network may cause uneven node distribution and lead to hotspots (e.g., topology aware Content Addressable Network (CAN) from Berkeley).

SUMMARY

One embodiment pertains to a method of expressway routing to peers. The method includes selecting a neighboring zone to a destination zone and retrieving a plurality of residents of the neighboring zone. The method also includes selecting a candidate peer from the plurality of residents based on a physical distance value and an estimated distance value.

Another embodiment relates to an apparatus for routing to peers. The apparatus includes means for selecting a neighboring zone to a destination peer based on a request and means for retrieving a plurality of residents of the neighboring zone. The apparatus also includes means for selecting a candidate peer from the plurality of residents based on a physical distance value and an estimated distance value.

Yet another embodiment pertains to a method of expressway routing among peers. The method includes receiving a request to forward data and determining a destination from the request. The method also includes searching a routing table for an expressway route to the destination and selecting a zone from the routing table based on the zone not encompassing the destination. The method further includes retrieving a plurality of residents of the zone and selecting a candidate from the plurality of residents based on a physical distance value and an ideal distance value.

Yet another embodiment relates to a system for expressway routing among peers in a peer-to-peer network. The system includes a peer-to-peer module configured to implement the peer-to-peer network, a routing module adapted to interface with the peer-to-peer module, and a routing table adapted to interface with the routing module. The routing module is configured to select a neighboring zone of a destination peer based on a received request and to retrieve a plurality of residents of the neighboring zone. The routing module is also configured to select a candidate peer from the plurality of residents based on a physical distance value and an estimated distance value.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4 illustrates a routing table shown in FIG. 3 in accordance with yet another embodiment;

DETAILED DESCRIPTION OF EMBODIMENTS

Figure 1:
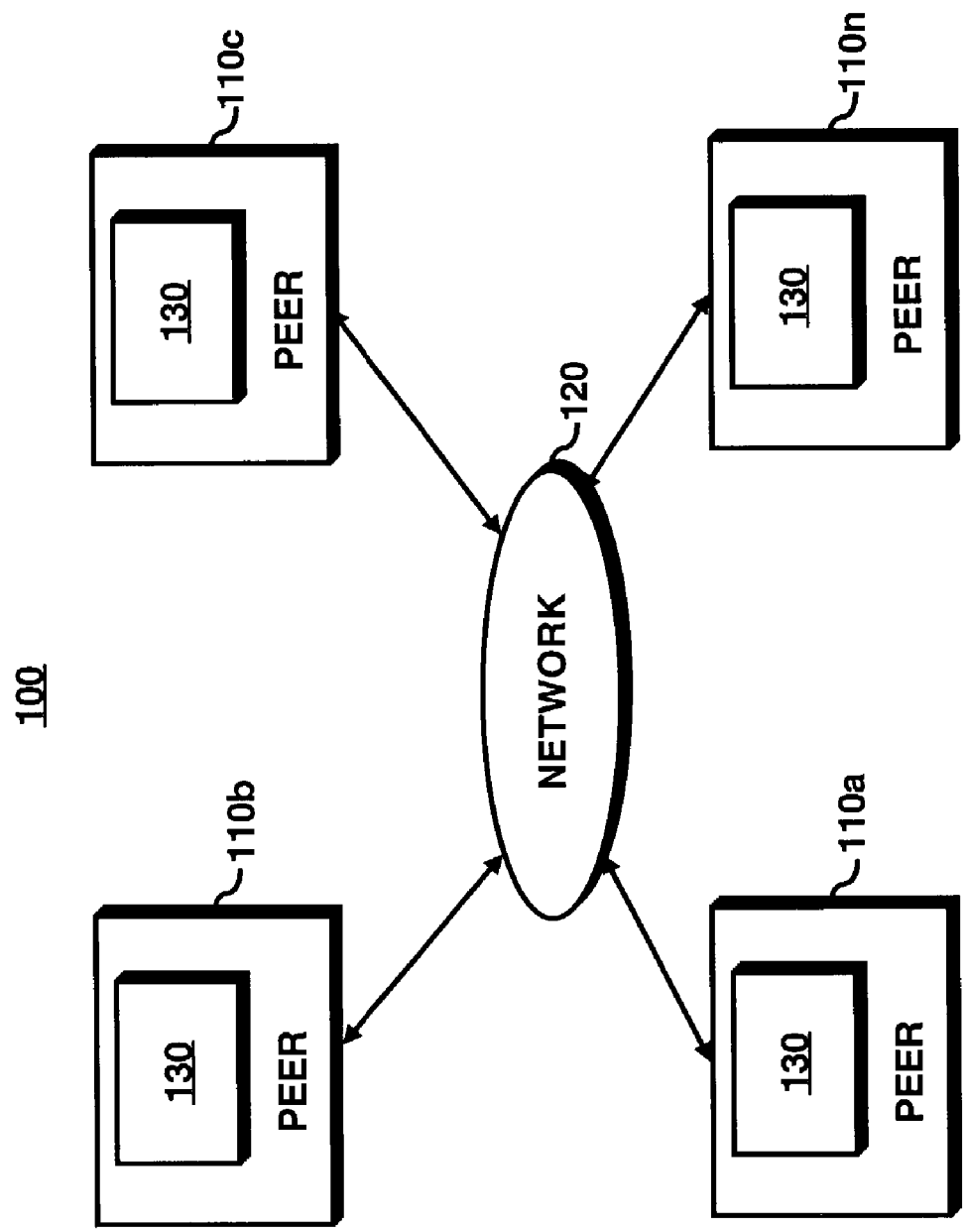
FIG. 1 illustrates an exemplary system where an embodiment may be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Certain embodiments relate to an expressway overlay network constructed over an underlying peer-to-peer (P2P) network. More particularly, an expressway overlay network may be created over the existing P2P network in one embodiment. The expressway overlay network provides a mechanism for a peer to find the most direct route, i.e., an expressway, to a destination in the smallest number of Internet hops. Each peer in the underlying P2P network includes an expressway routing module which collectively implement the expressway overlay network. Further detail and discussion of the expressway overlay network may be found in U.S. application Ser. No. 10/237,618, filed on Sep. 10, 2002, and entitled "CREATING EXPRESSWAYS FOR OVERLAY ROUTING" by Zhang et al., which is assigned to the present assignee, and the disclosure of which is hereby incorporated by reference in its entirety.

The expressway overlay network may be decomposed into a hierarchal layer of zones. On one end of the hierarchy, the layer comprises of a single zone that is the entire space of the underlying P2P network. On the other end, the end layer comprises of the basic zones (or units) surrounding the peers of the underlying P2P network, where the number of zones is equivalent to the number of peers (or nodes) in the P2P network. In the intermediate layers of the hierarchy, each layer comprises of zones of a distinct size. For a selected zone in a particular layer, the selected zone may encompass smaller zones of the intermediate layers below the particular layer as well as the basic unit of a peer. Each zone may have one or more residents which act as a representative for the zone. However, for each peer of the P2P network, each peer is the owner of its respective zone.

The expressway routing module may utilize a routing table that captures the hierarchal nature of the expressway overlay network. The routing table of a selected peer may comprise a number of entries related to the number of layers in the expressway overlay network. Each entry in the routing table is associated with the zone of the selected peer in a given layer, neighboring zones for the zone, and one or more residents in each of the neighboring zones. The routing table entry that reflects the current state of the zone surrounding a peer, i.e., top of the hierarchy, may be referred to as a current table entry.

In yet another embodiment, the expressway routing module utilizes the routing table to expressway route between peers. More specifically, a peer may search the routing table for the largest zone that does not encompass the destination peer in response to a request to forward data, i.e., the corresponding neighboring zone that encompasses the destination. A communication channel is formed, i.e., an expressway, between the peer and a zone representative of the largest neighboring zone. If a neighboring zone is not found, the expressway routing module routes to an intermediate peer and the process to find the largest zone that does not encompass the destination repeats. Further detail and description of the expressway routing may be found in U.S. application Ser. No. 10/231,184, filed on Aug. 30, 2002, and entitled "EXPRESSWAY ROUTING AMONG PEERS" by Xu et al., which are assigned to the assignee and are incorporated by reference herein in their entirety.

In accordance with yet another embodiment, the expressway routing module may be configured to select the resident of plurality of residents in a selected neighboring zone that minimize latency when expressway routing to the selected neighboring zone. More specifically, along a routing path between a source peer to a destination peer, any intermediate peer (including the source peer), peer n, may have multiple residents to select when routing to the next intermediate (or final) zone. The residents of the intermediate/destination zone may be considered as candidate peers, nodes ($c_1 \ldots c_n$). The expressway routing module may determine the candidate peer that minimizes latency based on determining a distance value based on physical and estimated distances between peer n, each of the candidate peers ($c_1 \ldots c_n$), and a destination peer. The candidate peer with the lowest or smallest distance value is then selected for routing.

The distance value may be determined as a function of the physical distance between peer n and a candidate peer, $c_i$, and the estimated distance based on peer n, candidate peers, and the destination peer. The physical distance between node n to a candidate peer, $c_i$, may be measured by the round trip time, a number of network hops, or other similar distance measure.

The estimated distance may be product of the logical (or ideal distance) between candidate peer, $c_i$, and a destination peer and a ratio. The ratio being an average of the physical distance between peer n and each of the candidate peers and average of the logical distances between peer n and each of the candidate peers. The logical distance may be determined as the distance between a candidate peer, $c_i$, and the destination node, d, in the expressway overlay network. For instance, the logical distance may be a Euclidean distance between the candidate peer, $c_i$, and the destination node, d, in the Cartesian space of the expressway overlay network. Another example of the logical distance may be the Euclidean distance between the center points of the zones that respectively contain the candidate peer, $c_i$, and the destination node, d, in the expressway overlay network.

In one embodiment, the ratio may be determined by the intermediate peer calculating an average of the physical distance from itself to each of the candidate peers, ($c_1 \ldots c_n$) and the intermediate peer calculating an average of the logical distance between itself to each of the candidate peers ($c_1 \ldots c_n$). The ratio may then be determined from the average of the physical distance to the average of the logical distance.

FIG. 1 illustrates an exemplary block diagram of a system 100 where an embodiment may be practiced. It should be readily apparent to those of ordinary skill in the art that the system 100 depicted in FIG. 1 represents a generalized schematic illustration and that other components may be added or existing components may be removed or modified.

As shown in FIG. 1, the system 100 includes a plurality of peers 110a ... 110n. The peers 110a ... 110n may be configured to exchange information among themselves and with other network nodes over a network 120. The peers 110a ... 110n may be computing platforms (e.g., personal digital assistants, laptop computers, workstations, and other similar devices) that have a network interface. The peers 110a ... 110n may be further configured to execute an application software program that provides the capability to share information (e.g., files, data, applications, etc.) in a peer-to-peer manner. An example of a peer-to-peer software application is KAZAA, NAPSTER, MORPHEUS, or other similar P2P applications.

The network 120 may be configured to provide a communication channel among the peers 110a ... 110n. The network 120 may be implemented as a local area network, wide area network or combination thereof. The network 120 may implement wired protocols such as Ethernet, token ring, etc., wireless protocols such as Cellular Digital Packet Data, Mobitex, IEEE 801.11b, Wireless Application Protocol, Global System for Mobiles, etc., or combination thereof.

According to an embodiment, each peer of the peers 110a ... 110b may comprise an expressway routing module 130. The expressway routing module 130 may implement an expressway overlay network for routing data over the existing P2P network, e.g., content addressable network (CAN), CHORD, etc. The expressway overlay network may be configured to divide the entire Cartesian space of the existing P2P system into zones, which is illustrated in FIG. 2.

Figure 2:
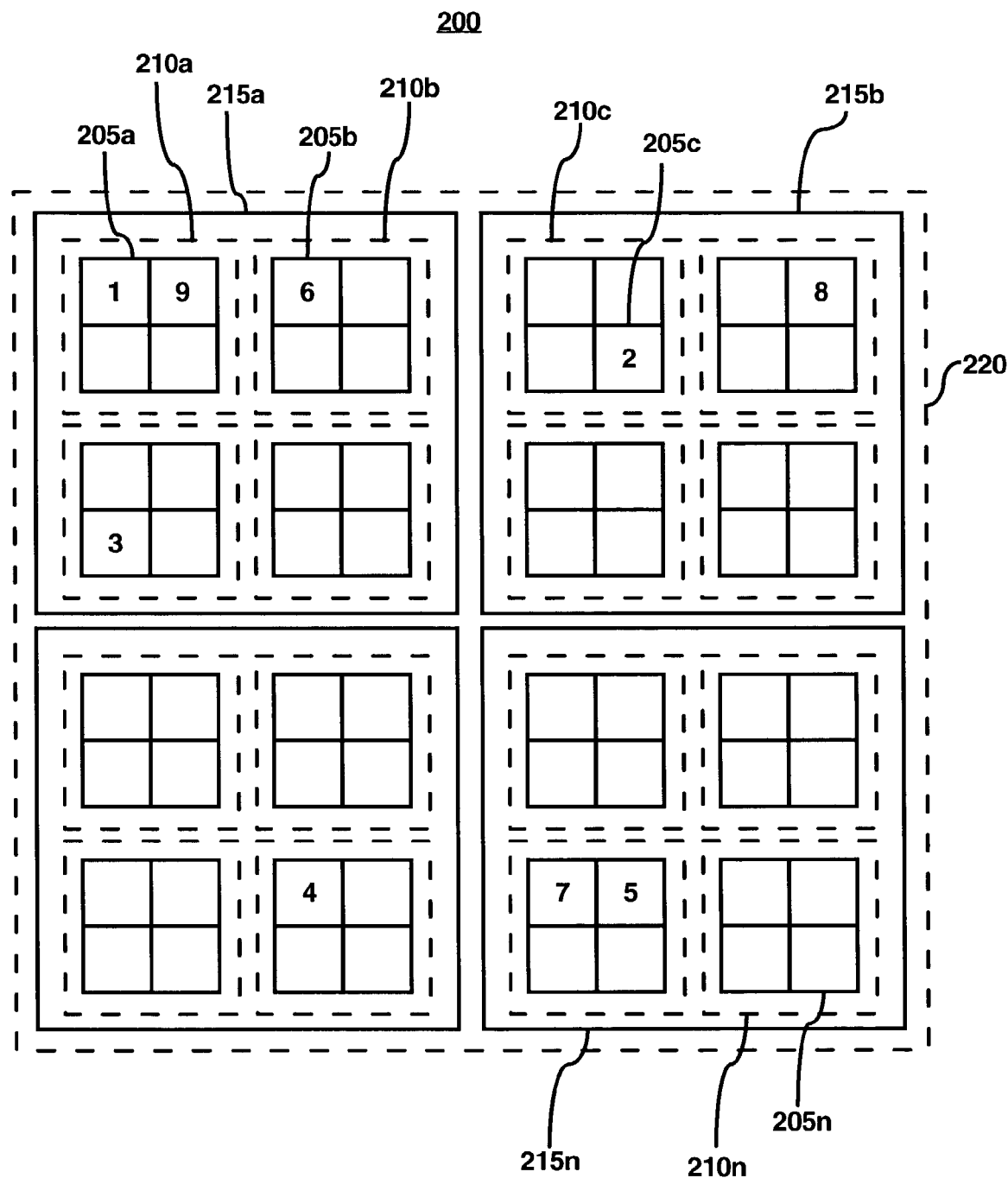
FIG. 2 illustrates an expressway overlay network according to an embodiment.

FIG. 2 illustrates an expressway overlay network 200 according to an embodiment. It should be readily apparent to those of ordinary skill in the art that the expressway overlay network 200 depicted in FIG. 2 represents a generalized abstraction and that other versions may be implemented.

As shown in FIG. 2, base zones 205a ... 205n may be the core unit of the underlying P2P network zone. For example, if the existing P2P network is a CAN network, the base zone is a CAN zone. In each base zone 205a ... 205n, a zone representative may be appointed. The zone representative may be considered the owner of the zone and becomes the routing point for data routed to the therein. For example, in zone 205a, peer 1 is the zone representative.

In another embodiment, the underlying network may be a Tapestry network. The prefix of the node identification (ID) may be considered a zone that encompasses the respective peer. The smaller the number of bits in the node ID, the larger the zone. Similarly, in yet another embodiment, the underlying network may be a Pastry network. The suffice of the node ID may be considered a zone that encompasses the peer. The smaller the number of bits in the node ID, the larger the zone. The difference between a CAN zone and a Tapestry zone is that the Tapestry zone is no longer Cartesian space. Rather, it is a set of possible node IDs. Note, in a CAN network, the node IDs are pointers and a Cartesian space is a set of pointers.

As part of the expressway overlay network 200, larger zones may be formed from smaller zones. For example, intermediate zones 210a ... 210n may be formed from the base zones 205a ... 205n. Intermediate zones 215a ... 215n may be formed from intermediate zones 210a ... 210n. The largest zone 220, the entire space of the P2P network, is formed from intermediate zones 215a ... 215n.

As with the base zone 205a ... 205n, the intermediates zones 210a ... 210n, 215a ... 215n, may elect (or appoint, select, etc.) one or more zone representatives for each zone. For example, peers 1, 3, and 6, individually and in combination, may become a representative for zone 210a. For example, peer 1 is the zone representative of base zone 205a as well as members of intermediate zones 210a and 215a. As another example, peer 6 may be zone representative for base zone 205b as well as members of intermediate zones 210b and 215b. Similarly, peer 2 can represent zone 205c and 215b.

In accordance with an embodiment, each zone, from base zone to largest zone, may be associated with a routing level, L, i.e., the number of expressways known to a peer. The highest value of the routing level, L, may indicate the depth of the expressway overlay network 200. For example, expressway overlay network 200 (see FIG. 2) may have L=3 which is associated with the base zone 205a ... 205n; L=2 associated with intermediate zones 210a ... 210n; L=1 associated with intermediate zones 215a ... 215n; and L=0 for the largest zone 220. Thus, indicating a depth of four (4) and the number of expressways known to the peer.

Returning to FIG. 1, the expressway routing module 130 may also be configured to form expressways between a source peer and a destination to route date according to another embodiment. For example, if peer 1 is to forward data to peer 2, peer 1 may determine that the largest zone that does not encompass the peer 2 is intermediate zone 215a (see FIG. 2). Subsequently, peer 1 forms a communication channel, e.g., a TCP/IP connection to the zone representative (e.g., peer 2) of intermediate zone 215b (a high-order neighbor of zone 215a), in FIG. 2, which is peer 2. Accordingly, data is routed in a substantially efficient manner by bypassing as many intermediate peers as possible between peer 1 and peer 2.

In another embodiment, a source peer may route data by expressways to an intermediate peer. More particularly, a source peer may select the largest neighboring zone based on the closest distance of the neighboring zone to the destination peer. For example, if peer 1 is requested to forward data to peer 7 (shown in FIG. 2), peer 1 may determine that the largest zone that does not encompass peer 7 is again 215a. Accordingly, peer 1 forms a communication channel to the zone representative, peer 2, of the largest neighboring zone 215b. Subsequently, peer 2 may search for the largest zone that does not encompass the destination to forward the data. Thus, each intermediate peer searches its routing table to find an expressway route to the destination peer.

Figure 3:
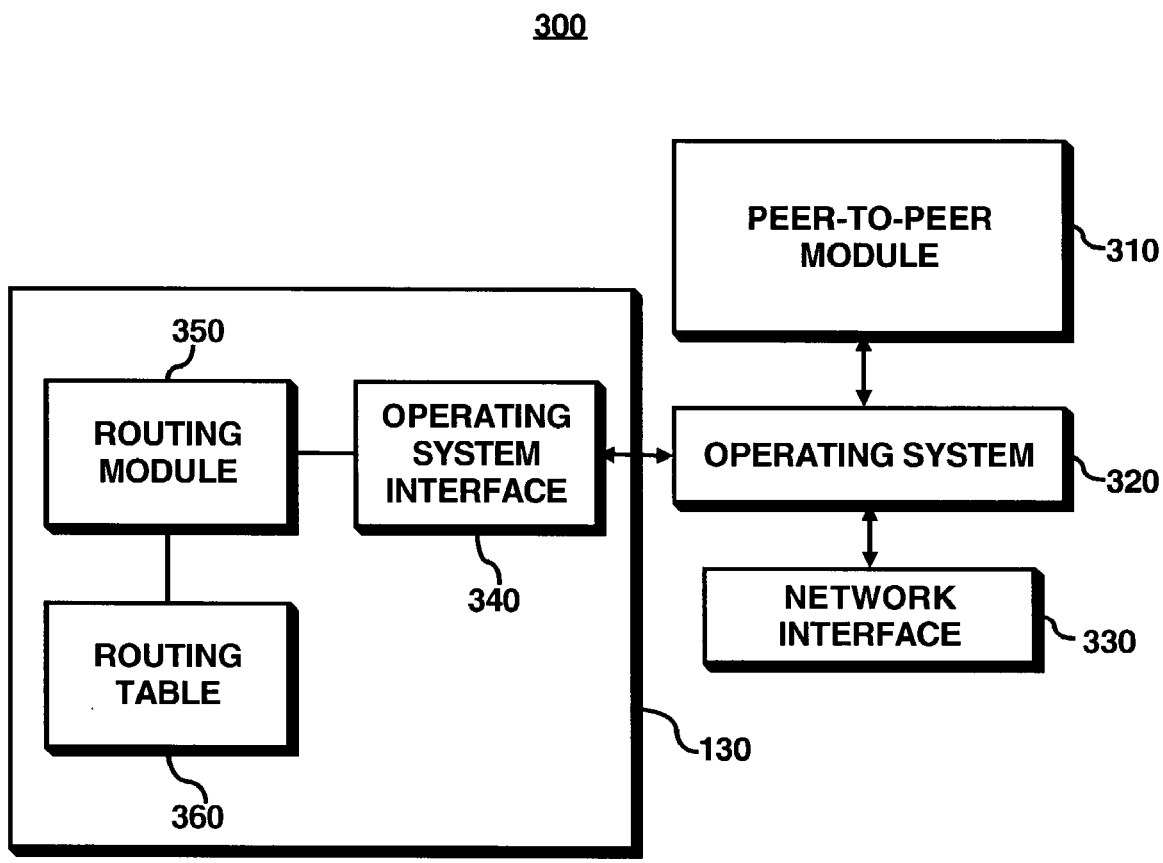
FIG. 3 illustrates an exemplary architecture for an expressway routing module shown in FIG. 1 according to another embodiment.

FIG. 3 illustrates an exemplary architecture 300 for the expressway routing module 130 shown in FIG. 1 in accordance with an embodiment. It should be readily apparent to those of ordinary skill in the art that the architecture 300 depicted in FIG. 3 represents a generalized schematic illustration and that other components may be added or existing components may be removed or modified. Moreover, the architecture 300 may be implemented using software components, hardware components, or a combination thereof.

As shown in FIG. 3, the architecture 300 may include a peer-to-peer module, an operating system 320, the expressway routing module 130, and a network interface. The peer-to-peer module 310 may be configured to provide the capability to a user of a peer to share information with another peer, i.e., each peer may initiate a communication session with another peer. The peer-to-peer module 310 may be a commercial off-the-shelf application program, a customized software application or other similar computer program. Such programs such as KAZAA, NAPSTER, MORPHEUS, or other similar P2P applications may implement the peer-to-peer module 310.

The expressway routing module 130 may be configured to monitor an interface between the peer-to-peer module 310 and the operating system 320 through an operating system interface 340. The operating system interface 340 may be implemented as an application program interface, a function call or other similar interfacing technique.

The expressway routing module 130 may include a routing module 350 and a routing table 360. The routing module 350 may be configured to implement the expressway overlay network and the expressway routing. More particularly, the routing module 350 may create an overlay network described with respect to FIG. 2, by implementing routing tables as shown in FIG. 4.

FIG. 4 illustrates routing table 360 as shown in FIG. 3 in accordance with an embodiment. It should be readily apparent to those of ordinary skill in the art that the routing table 360 depicted in FIG. 4 represents a generalized illustration and that other fields may be added or existing fields may be removed or modified.

As shown in FIG. 4, the routing table 360 may include a routing level field 405, a zone field 410, a neighboring zones field 415, and a resident field 420. In one embodiment, the values in the routing level field 405, the zone field 410, the neighboring zones 415, and the resident field 420 are associated or linked together in each entry of the entries 425a . . . 425n.

A value in the routing level field 405 may indicate the span the between zone representatives. The range of values for the level of the zone may range from the basic unit of the P2P system ($R_L$) to the entire space of the P2P system ($R_0$). The largest value in the routing level field 405 may indicate the depth of the routing table as well as being the current table entry.

A value in the zone field 410 may indicate which zones the associated peer is aware thereof. At the $R_0$ level for peer 1, the zone would be in the entire space of the existing P2P network. For example, with reference to FIG. 2, the entire space of the P2P system is a Cartesian space of two dimensions (x, y). The zone may be indicated by a designation of (0 . . . 1) in the x-direction and (0 . . . 1) in the y-direction. At the $R_L$ level for peer 1, the zone may be indicated by a designation of (0 . . . 0.125) in the x-direction and (0.875 . . . 1).

Values in the neighboring zones field 415 indicate the identified neighbor zones to the peer. A neighbor zone may be determined by whether a zone shares a common border in the coordinate space; i.e., in a d-dimensional coordinate space, two nodes are neighbors if their coordinate spans overlap along d-1 dimensions and abut along one dimension. Continuing on with the above example, at the $R_0$ level for peer 1, the neighboring zones may be designated as lower neighbor zone: (0 . . . 1)(0 . . . 1) with zone representative as peer 1 and upper neighbor zone (0 . . . 1)(0 . . . 1) with zone representative as peer 1 in the x-direction. The neighboring zones in the y-direction may be designated as lower neighbor zone (0 . . . 1)(0 . . . 1) with zone representative as peer 1 and upper neighbor zone (0 . . . 1)(0 . . . 1) with zone representative as peer 1. Similarly, for peer 1's zone at level L, its lower neighbor along x-direction is the zone (0.875 . . . 1)(0.875 . . . 1) with peer 8 as the representative, whereas it upper neighbor is the zone (0.125 . . . 0.25) (0.875 . . . 1.0) with peer 9 as representative. It should be noted that only representative for neighbor zones at level L need to be kept as hard state (i.e., unmodified), the representatives for neighbor zones at a lower-level are soft states that can be modified on-the-fly to adapt to changing network conditions. In one embodiment, the representatives of a neighbor zone are selected based on closest distance (e.g., number of hops) to the current peer.

Values in the resident fields 420 may indicate the identities of residents for the neighboring zones stored in the neighboring zones field 415. The values in residents field 420 may be indexed to the values the neighboring zones field 415 to associate the appropriate resident in the proper neighboring zone.

Returning to FIG. 3, the routing module 350 may be implemented as a software program, a utility, a subroutine, or other similar programming entity. In this respect, the routing module 350 may be implemented using software languages such as C, C++, JAVA, etc. Alternatively, the routing module 350 may be implemented as an electronic device utilizing an application specific integrated circuit, discrete components, solid-state components or combination thereof.

The operating system 320 may be configured to manage the software applications, data and respective hardware components (e.g., displays, disk drives, etc.) of a peer. The operating system 320 may be implemented by the MICROSOFT WINDOWS family of operating systems, UNIX, HEWLETT-PACKARD HP-UX, LINUX, RIM OS, and other similar operating systems.

The operating system 320 may be further configured to couple with the network interface 330 through a device driver (not shown). The network interface 330 may be configured to provide a communication port for the respective peer over the network 120 (shown in FIG. 1). The network interface 330 may be implemented using a network interface card, a wireless interface card or other similar input/output device.

Figure 5A:
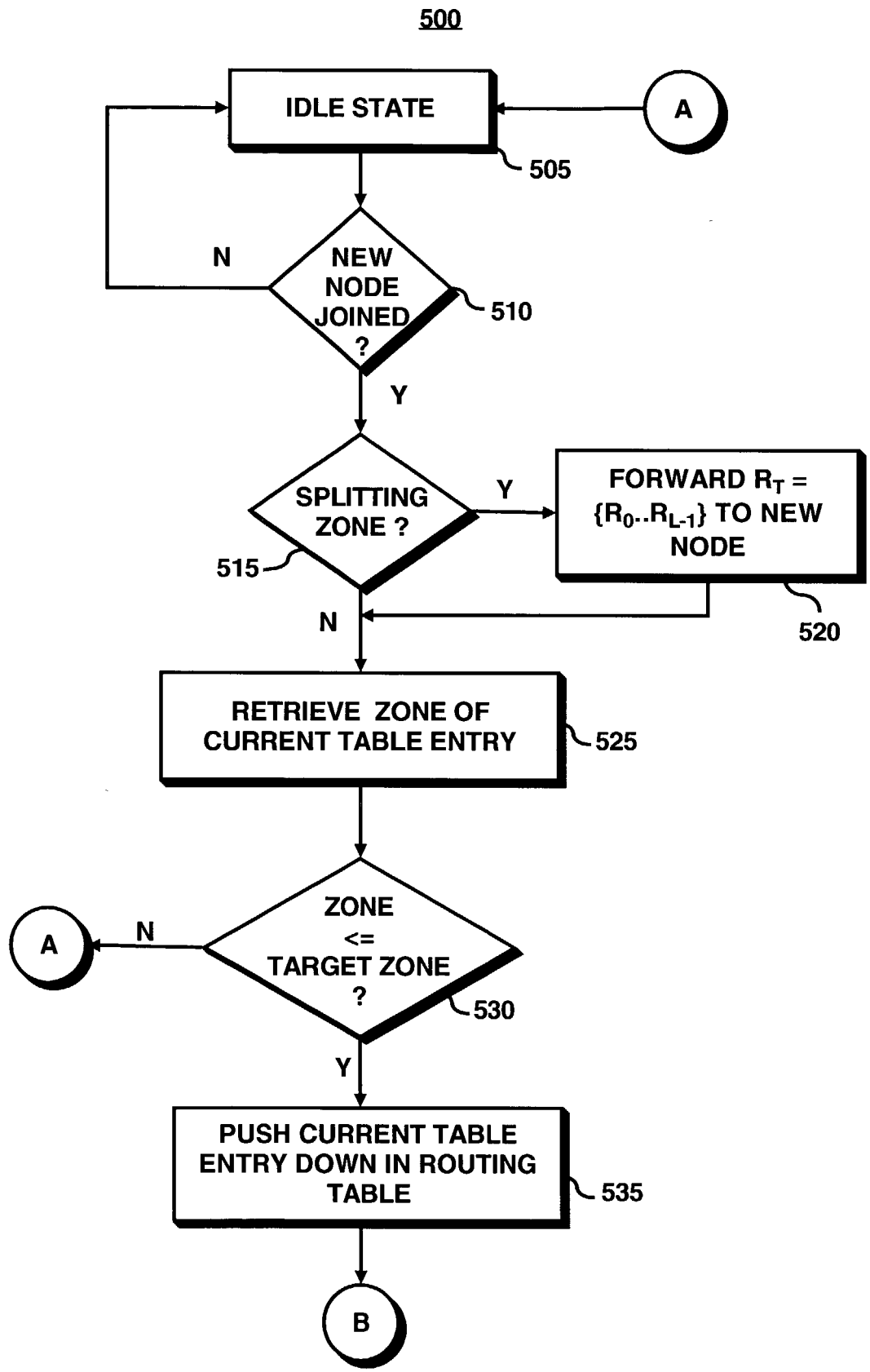
FIGS. 5A-B collectively illustrate an exemplary flow diagram according to yet another embodiment.
Figure 5:
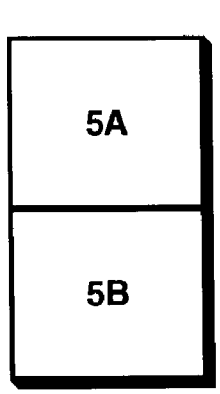
FIG. 5 is a key to FIGS. 5A-B.

FIG. 5 illustrates an exemplary flow diagram for a method 500 creating an overlay network for expressway routing shown in FIGS. 1 and 3 in accordance with another embodiment. It should be readily apparent to those of ordinary skill in the art that this method 500 represents a generalized illustration and that other steps may be added or existing steps may be removed or modified.

Referring to FIG. 5A, the routing module 350 may be in an idle state, in step 505. The routing module may detect a new node (or peer) joining the peer-to-peer network, in step 510. This check may be performed on a periodic basis or may be event-driven.

If the routing module 350 determines that a new node has not joined, the routing module 350 may return to the idle state of step 505. Otherwise, if the routing module 350 determines that a new node has joined, the routing module 350 may determine whether the new node is joining the network in the zone occupied by a selected (or host) peer that is executing the routing module 350. In other words, checking whether the new peer is splitting or sharing the zone of a selected peer.

If the new peer is joining an existing zone of a selected peer, the routing module 350 of the selected peer may forward the entries in the routing table 360 excluding the current table entry, i.e., $R_T = \{R_0 \ldots R_{L-1}\}$, to the new peer, in step 520. The new peer inherits the forwarded routing table and uses the forwarded routing table as part of its respective routing table, which is further described U.S. application Ser. No. 10/299,908, filed on Aug. 30, 2002, and entitled "METHOD AND APPARATUS FOR GENERATING ROUTING TABLES" by Zheng et al., which is assigned to the assignee and are incorporated by reference herein in their entirety. Subsequently, the routing module 350 may proceed to the processing of step 525.

Returning to step 515, if the routing module 350 determines that the new node is not joining the zone of the selected peer, the routing module 350 may retrieve the zone, $R_L Z$, from the current table entry for the selected peer, in step 525.

In step 530, the routing module 350 may compare the zone of the current table entry of the selected peer with the target zone. In an embodiment, the target zone may be chosen as the zone from a previous routing table entry divided by the span of the expressway, e.g., $(R_{L-1}Z)K$, where K can user-specified. In other embodiments, the target zone may be user-specified or selected based on network parameters.

If the zone of the current table entry is greater than the target zone, the routing module 350 may return to the idle state of step 505. Otherwise, if the zone of the current table entry is smaller or equal to the target zone, the routing module 350 may push the current table entry to the routing table 360 of the selected peer executing the routing module 350, in step 535. In effect, the routing module 350 may create a 'new' version of the current table entry.

Figure 5B:
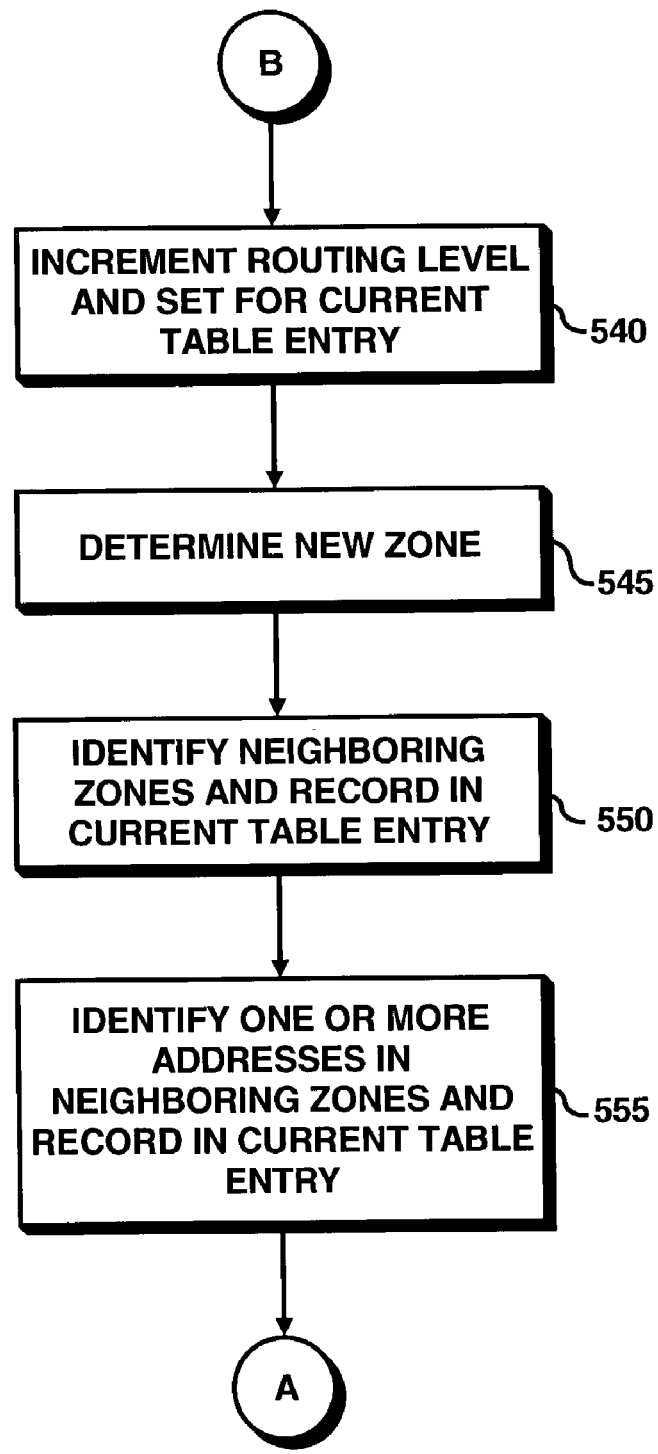

Referring to FIG. 5B, in step 540, the routing module 350 may increment the value of the routing level. The routing module 350 may then associate the new value of the routing level as the latest version of the current table entry (e.g., entry 420n in FIG. 4), i.e., growing the routing table 360.

The routing module 350 may be configured to determine a new zone, in step 545. The determined zone may then be associated with the current routing table entry. In step 550, the routing module 350 may identifying neighboring zones and associates the neighboring zone with the current routing table entry. In step 555, the routing module 350 may be configured to identify one or more addresses in each of the neighboring zones as residents therein. The one or more addresses may then be associated with the current table entry (e.g., entry 420n in FIG. 4). Subsequently, the routing module 350 may be configured to return to the idle state of 505 (shown in FIG. 5A).

Figure 6:
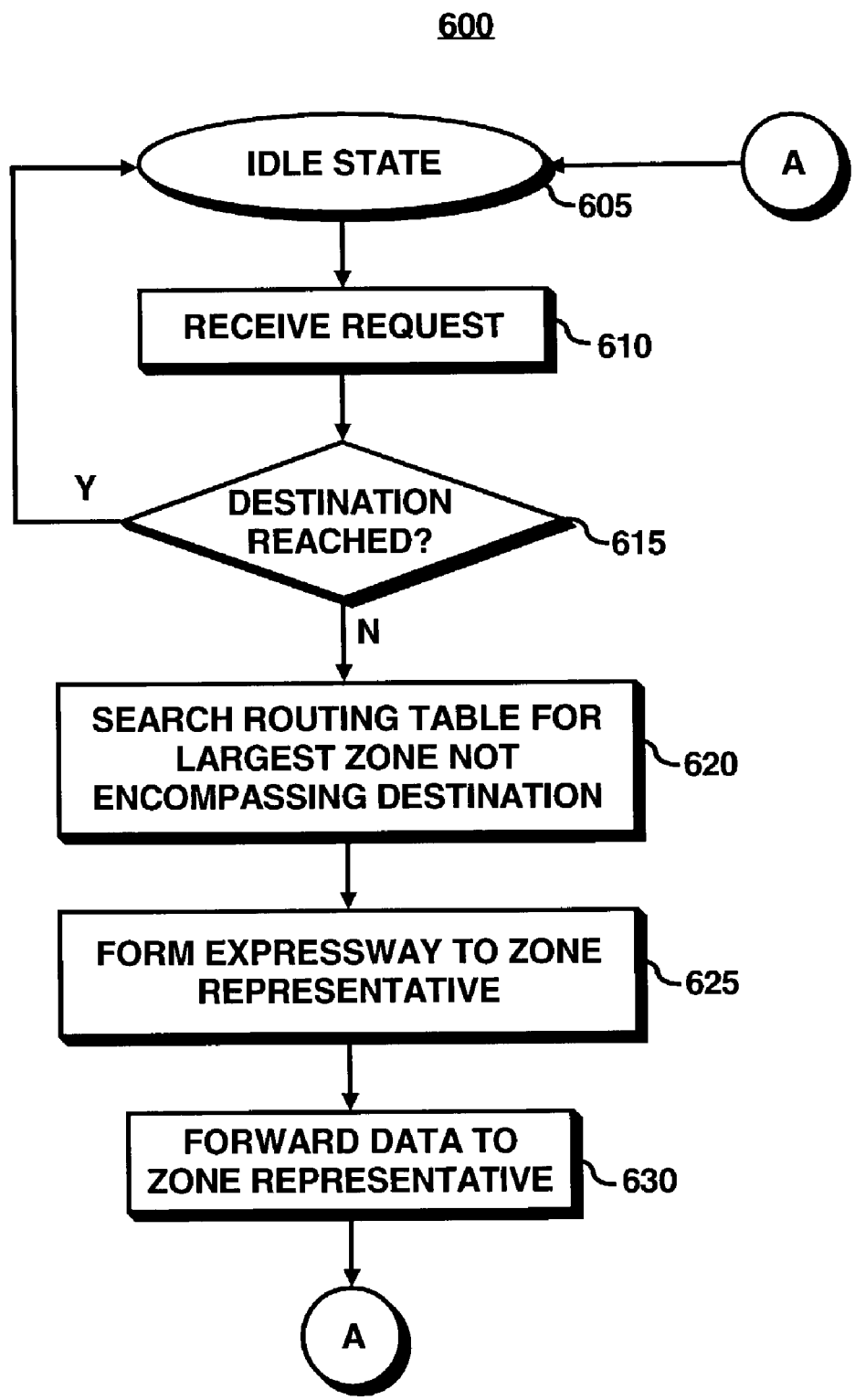
FIG. 6 illustrates an exemplary flow diagram according to yet another embodiment.

FIG. 6 illustrates an exemplary flow diagram for a method 600 of the expressway routing module 130 and routing module 350 shown in FIGS. 1 and 3 in accordance with another embodiment. It should be readily apparent to those of ordinary skill in the art that this method 600 represents a generalized illustration and that other steps may be added or existing steps may be removed or modified.

As shown in FIG. 6, the routing module 350 of the expressway routing module 130 may be configured to be in an idle state in step 605. The routing module 350 may monitor the network interface 330 via the operating system 320 (shown in FIG. 3) for any received requests to route data. A user of a peer may initiate the requests or the requests may be forwarded to the receiving peer functioning as an intermediate peer.

In step 610, the routing module 350 may detect a message (or request) received through the network interface 330. The routing module 350 may be configured to temporarily store the message for processing.

In step 615, the routing module 350 determines whether the message has reached its destination. More particularly, the routing module 350 may check the destination address of the message to determine whether the receiving peer is the destination for the message. If the destination is the receiving peer, the routing module 350 may return to the idle state of step 605.

Otherwise, in step 620, the routing module 350 may be configured to search the routing table 350 for a largest zone not encompassing the destination. It should be noted that the largest zone that does not encompass the destination can always be found, given the way the zones are determined as described above. Moreover, in the event that an expressway to the destination peer, i.e., an intermediate peer is found, the routing module 350 may expressway route, as described below, to the intermediate peer and repeat method 600 at the intermediate peer.

In step 625, the routing module 350 may be configured to form a communication channel, i.e., an expressway, to the zone representative of the destination zone at the level of the largest zone. The routing module 350 may forward the requested data to the zone representative in the destination zone in step 630. The zone representative will then forward the data to the destination peer. Subsequently, the routing module 350 may return to the idle state of step 605.

Figures 7, 7A:
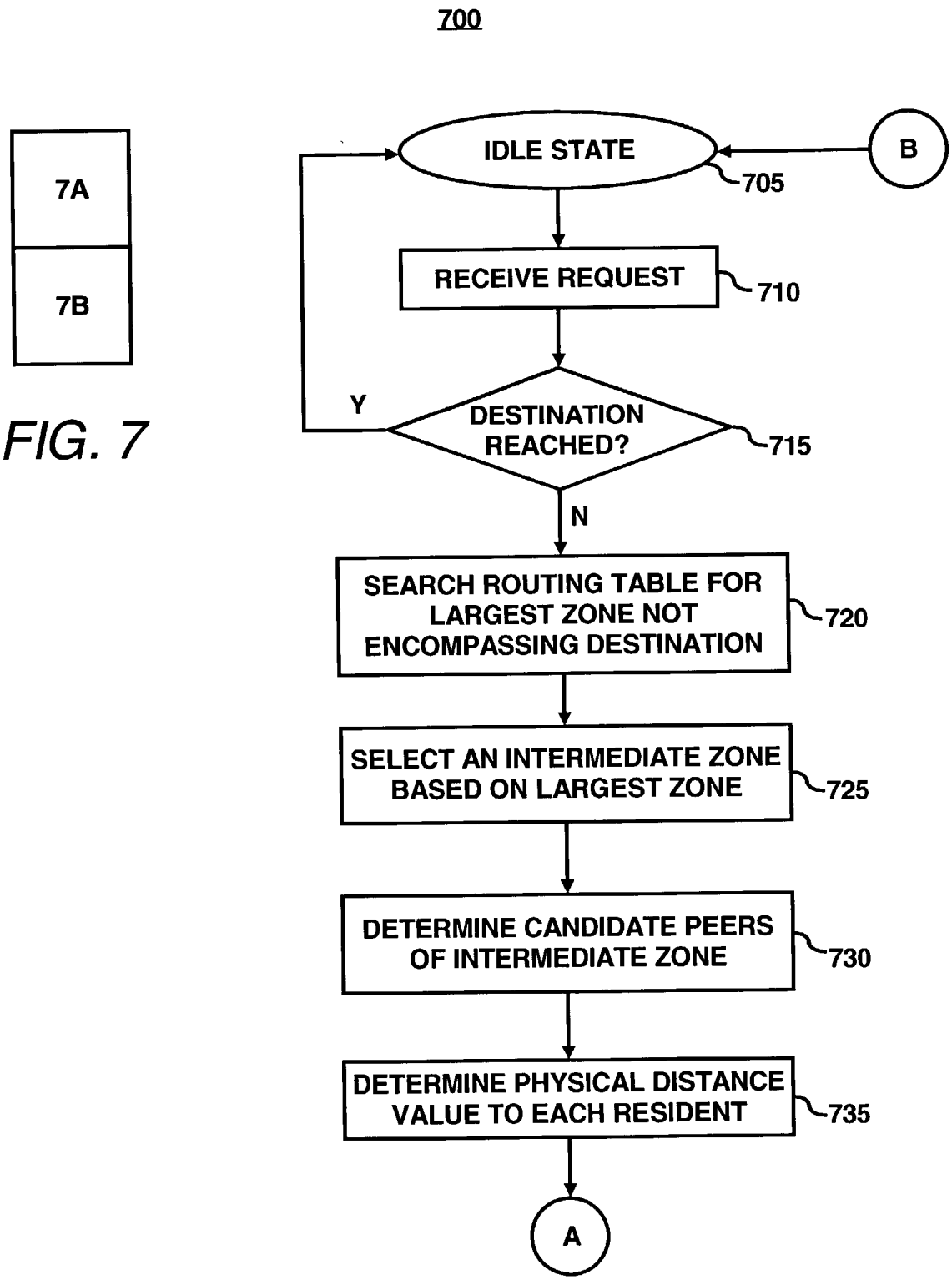
FIG. 7 is a key to FIGS. 7A-B.
FIGS. 7A-B collectively illustrates an exemplary flow diagram according to yet another embodiment.
Figure 7B:
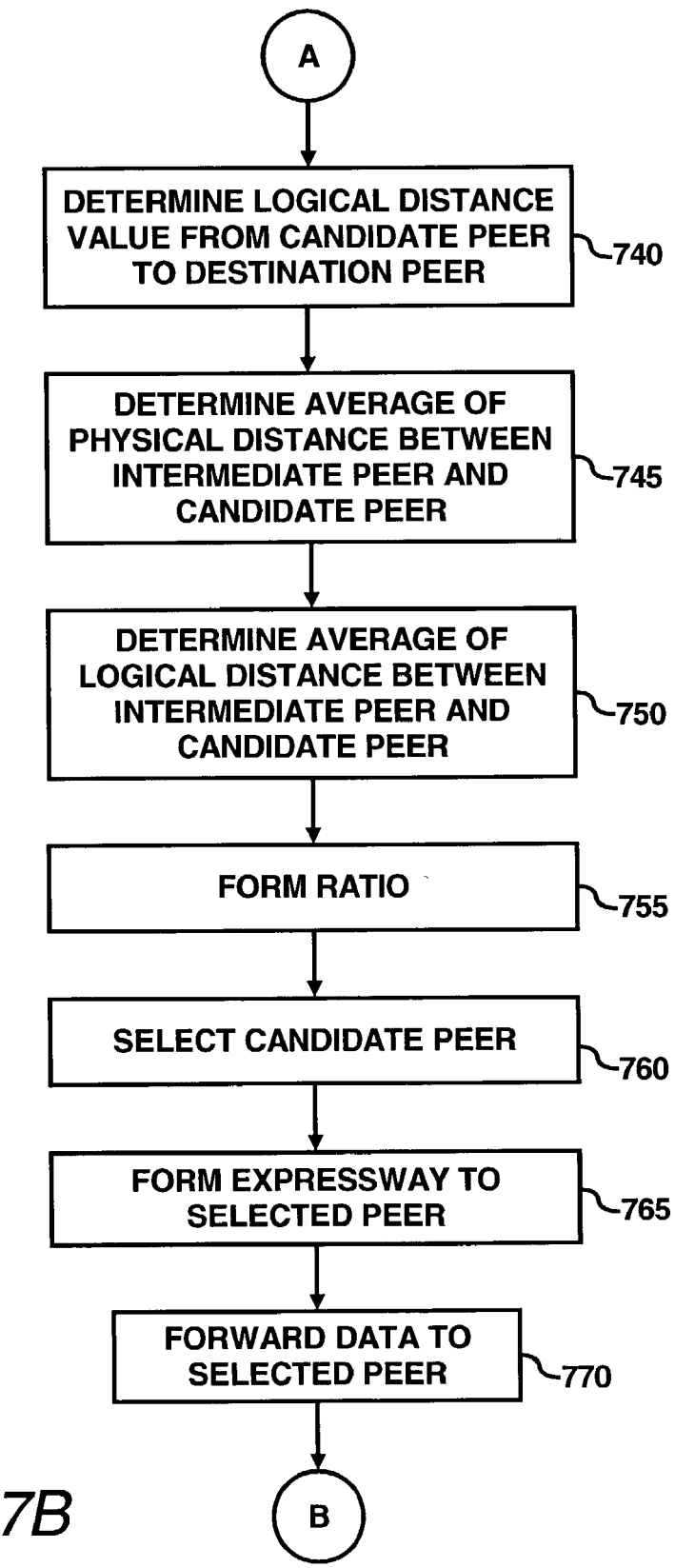

FIGS. 7A-B collectively illustrate an exemplary flow diagram 700 for expressway routing implemented by the expressway routing module 130 and routing module 350 shown in FIGS. 1 and 3 in accordance with another embodiment. It should be readily apparent to those of ordinary skill in the art that this flow diagram 700 represents a generalized illustration and that other steps may be added or existing steps may be removed or modified.

As shown in FIG. 7A, the routing module 350 of the expressway routing module 130 may be configured to be in an idle state in step 705. The routing module 350 may monitor the network interface 330 via the operating system 320 (shown in FIG. 3) for any received requests to route data. A user of a peer may initiate the requests or the requests may be forwarded to the receiving peer functioning as an intermediate peer.

In step 710, the routing module 350 may detect a message (or request) received through the network interface 330. The routing module 350 may be configured to temporarily store the message for processing.

In step 715, the routing module 350 determines whether the message has reached its destination. More particularly, the routing module 350 may check the destination address of the message to determine whether the receiving peer is the destination for the message. If the destination is the receiving peer, the routing module 350 may return to the idle state of step 705.

Otherwise, in step 720, the routing module 350 may be configured to search the routing table 350 for a largest zone not encompassing the destination. It should be noted that the largest zone that does not encompass the destination can always be found, given the way the zones are determined as described above. Given this zone, an intermediate zone (a high-order neighbor of the largest zone that does not encompass the destination) is identified.

From the selection of the largest zone not encompassing the destination (destination or intermediate zone), the routing module 350 may be configured to select an intermediate zone that neighbors the largest zone, in step 725.

In step 730, the routing module 350 may be configured to select the residents of the selected intermediate zone as candidate peers (e.g., $c_1 \ldots c_n$). The routing module 350 may extract the residents from the routing table 360.

In step 735, the routing module 350 may be configured to determine the physical distance, d, from the peer executing the routing module, e.g., peer n, to each of the candidate peers, (e.g., $c_1 \ldots c_n$). The physical distance may be measured by hops, or latencies. This may be accomplished by measuring round trip time (RTT), using an operating system utility ping, or executing a tool called TRACE-ROUTE. The routing module 350 may temporarily store the physical distance ($pd_1 \ldots pd_n$) for further processing.

Referring to FIG. 7B, in step 740, the routing module 350 may be configured to determine the logical distance (or ideal) distance value, l, from the candidate peers, ($c_1 \ldots c_n$), to the destination, i.e., ($l_1 \ldots l_n$). The logical distance value, l, may be the Euclidean distance between a selected candidate peer, e.g., $c_i$, to the destination peer, d. Alternatively, the logical distance value, l, may be the Euclidean distance between the respective centers of the zones of a selected candidate peer and the destination peer.

In step 745, the routing module 350 may be configured to determine an average for the physical distance, $pd_{avg}$, between the peer executing the routing module 350, n, and each of the candidate peers. In one embodiment, the routing module 350 may retrieve the physical distance values, ($pd_1 \ldots pd_n$) to determine the average of the physical distance, $pd_{avg}$.

In step 750, the routing module 350 may be configured to determine an average for the logical distance, $ld_{avg}$, between the peer n and each of the candidate peers. In step 755, a ratio, k, may be determine by the ratio of the average of the physical distance, $pd_{avg}$, and the average of the logical distance $ld_{avg}$.

In step 760, the routing module 350 may be configured to select the candidate peer. More particular, the routing module 350 takes the minimal value of a distance function, the distance function being physical distance added to the product of ratio, k, and logical distance or expressed mathematically as equation 1:

$$pd_i + ld_i k \qquad (1)$$

In other words, the distance function is calculated for each candidate peer and the lowest value for the distance function is selected.

In step 765, the routing module 350 may form a communication channel, i.e., an expressway, to the candidate peer of the destination zone at the level of the largest zone. The routing module 350 may forward the requested data to the zone representative in the destination zone in step 770. The zone representative will then forward the data to the destination peer. Subsequently, the routing module 350 may return to the idle state of step 705 (shown in FIG. 7A).

Figure 8:
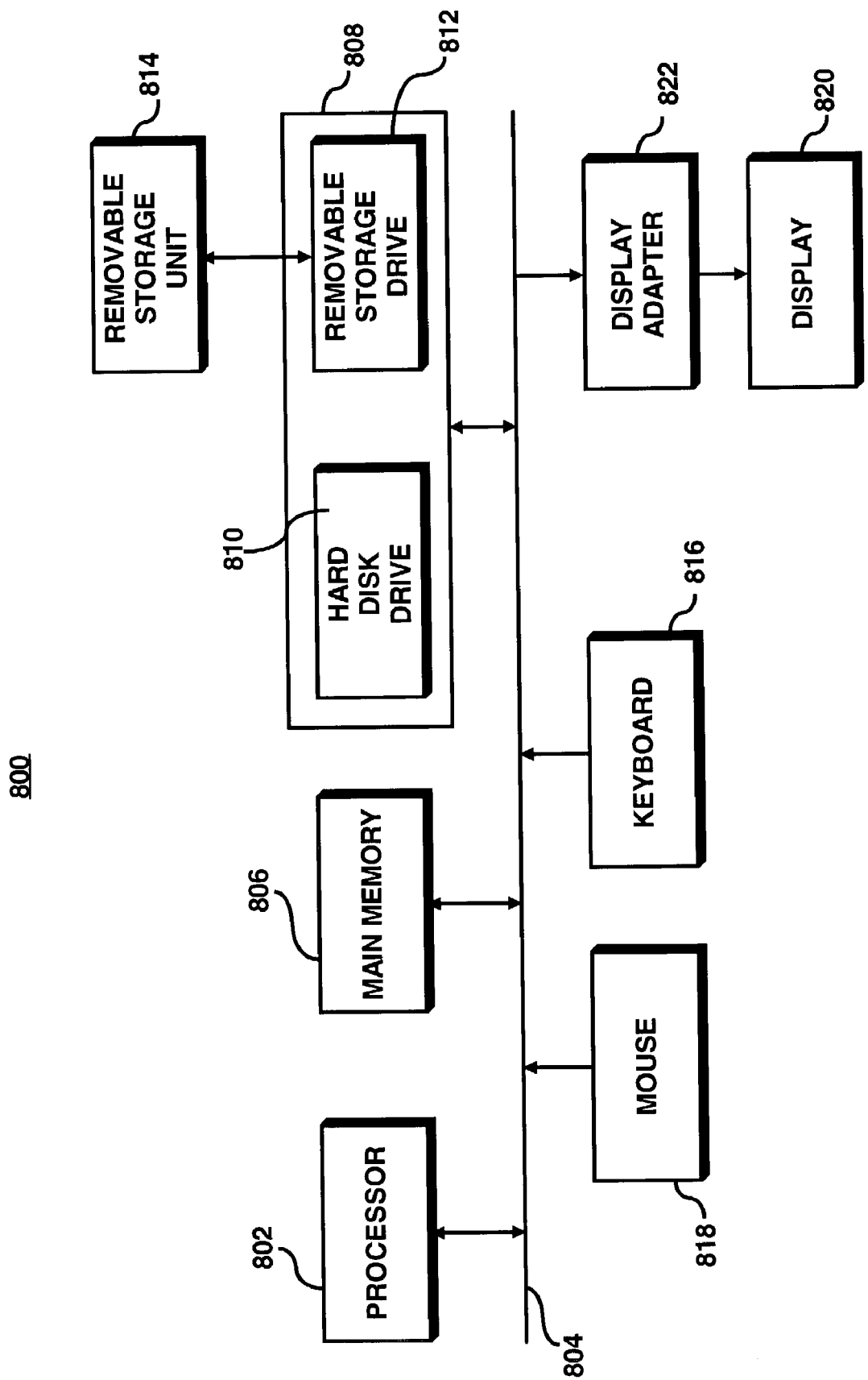
FIG. 8 illustrates a computer system where an embodiment may be practiced.

FIG. 8 illustrates an exemplary block diagram of a computer system 800 where an embodiment may be practiced. The functions of the expressway routing module may be implemented in program code and executed by the computer system 800. The expressway routing module may be implemented in computer languages such as PASCAL, C, C++, JAVA, etc.

As shown in FIG. 8, the computer system 800 includes one or more processors, such as processor 802, that provide an execution platform for embodiments of the expressway routing module. Commands and data from the processor 802 are communicated over a communication bus 804. The computer system 800 also includes a main memory 806, such as a Random Access Memory (RAM), where the software for the expressway routing module may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the expressway routing module may be stored. The removable storage drive 812 reads from and/or writes to a removable storage unit 814 in a well-known manner. A user interfaces with the expressway routing module with a keyboard 816, a mouse 818, and a display 820. The display adaptor 822 interfaces with the communication bus 804 and the display 820 and receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of expressway routing to peers, comprising:
   selecting a neighboring zone to a destination zone;
   retrieving a plurality of residents of said neighboring zone;
   selecting a candidate peer from said plurality of residents based on a physical distance value and an estimated distance value;
   determining a plurality of physical distance values, each physical distance value based on a physical distance to each resident of said plurality of residents;
   determining a plurality of logical distance values, each logical distance value determined from each resident of said plurality of residents to a destination peer;
   determining a ratio based on an average physical distance between a source peer to each resident of said plurality of residents to an average logical distance between said source peer to each resident of said plurality of residents; and
   determining a plurality of estimated distance values, each estimated distance value being a product of a respective logical distance value and said ratio.

2. The method according to claim 1, further comprising:
   forming a communication channel to said candidate peer; and
   forwarding a request to forward data to said candidate peer.

3. The method according to claim 1, further comprising:
   determining a plurality of distance values, each distance value based on a respective physical distance value added to respective estimated distance value.

4. The method according to claim 3, wherein said selection of said candidate peer is based on said candidate peer having a smallest value among said plurality of distance values.

5. An apparatus for routing to peers, comprising:
   means for selecting a neighboring zone to a destination peer based on a request;
   means for retrieving a plurality of residents of said neighboring zone;

means for selecting a candidate peer from said plurality of residents based on a physical distance value and an estimated distance value;

means for determining a plurality of physical distance values, each physical distance value based on a physical distance to each resident of said plurality of residents;

means for determining a plurality of logical distances, each logical distance determined from each resident of said plurality of residents to a destination peer;

means for determining a ratio based on an average physical distance between a source peer to each resident of said plurality of residents to an average logical distance between said source peer to each resident of said plurality of residents; and means for determining a plurality of estimated distances, each estimated distance being a product of a respective logical distance value and said ratio.

6. The apparatus according to claim 5, further comprising:

means for forming a communication channel to said candidate peer; and means for forwarding said request to said candidate peer.

7. The apparatus according to claim 5 further comprising:

means for determining a plurality of distance values, each distance value based on a respective physical distance value added to a respective estimated distance value.

8. The apparatus according to claim 7, wherein said means for selection of said candidate peer is based on said candidate peer having a smallest value among said plurality of distance values.

9. A method of expressway routing among peers, comprising:

receiving a request to forward data;

determining a destination from said request;

searching a routing table for an expressway route to said destination;

selecting a zone from said routing table based on said zone not encompassing said destination;

retrieving a plurality of residents of said zone;

selecting a candidate from said plurality of residents based on a physical distance value and an ideal distance values;

determining a plurality of physical distance values, each physical distance value based on a physical distance to each resident of said plurality of residents;

determining a plurality of logical distance values, each logical distance value determined from each resident of said plurality of residents to the destination;

determining a ratio based on an average physical distance between a source of the data to each resident of said plurality of residents to an average logical distance between said data source to each resident of said plurality of residents; and determining a plurality of estimated distance values, each estimated distance value being a product of a respective logical distance value and said ratio.

10. The method according to claim 9, further comprising:

forming said expressway route to a zone representative of said largest zone that does not encompass said destination.

11. The method according to claim 9, further comprising:

terminating said searching of said routing table in response to said destination being a peer receiving said request to forward said data.

12. The method according to claim 9, further comprising:

forming a TCP/IP connection to build said expressway route to said destination.

13. The method according to claim 9, further comprising:

determining a plurality of intermediate zones in response to said search of routing table for said expressway; and selecting an intermediate zone from said plurality of intermediate zones.

14. The method according to claim 13, wherein said selection of said intermediate zone of said plurality of intermediate zones based on said intermediate zone being closest to said destination.

15. A system for expressway routing among peers in a peer-to-peer network, said system comprising:

a peer-to-peer module operates to implement said peer-to-peer network;

a routing module operates to interface with said peer-to-peer module; and a routing table operates to interface with said routing module, wherein said routing module is configured:

to select a neighboring zone of a destination peer based on a received request;

to retrieve a plurality of residents of said neighboring zone;

to select a candidate peer from said plurality of residents based on a physical distance value and an estimated distance value;

to determine a plurality of physical distance values, each physical distance value based on a physical distance to each resident of said plurality of residents;

to determine a plurality of logical distance values, each logical distance value determined from each resident of said plurality of residents to the destination peer;

to determine a ratio based on an average physical distance between a source peer to each resident of said plurality of residents to an average logical distance between said source peer to each resident of said plurality of residents; and to determine a plurality of estimated distance values, each estimated distance value being a product of a respective logical distance value and said ratio.

16. The system according to claim 15, further comprising:

an operating system operates to manage said peer-to-peer module and said routing module; and an operating system interface operates to connect said operating system and said routing table.

17. The system according to claim 16, further comprising:

a network interface operates to interface said peer-to-peer module with a network through said operating system.

18. The system according to claim 15, wherein the routing module is further operates to determine a largest zone that does not encompass said destination.

19. The system according to claim 15, wherein said logical distance value is an Euclidean distance in Cartesian space.

20. The system according to claim 15, wherein said physical distance value is a round-trip time value.

21. The system according to claim 15, wherein said physical distance value is a number of hops.

* * * * *

UNITED STATES PATENT AND TRADEMARK OFFICE
CERTIFICATE OF CORRECTION

| | |
|---|---|
| PATENT NO. | : 7,289,520 B2 |
| APPLICATION NO. | : 10/299907 |
| DATED | : October 30, 2007 |
| INVENTOR(S) | : Zhichen Xu, et al. |

Page 1 of 1

It is certified that error appears in the above-identified patent and that said Letters Patent is hereby corrected as shown below:

In column 13, line 42, in Claim 9, delete "values" and insert -- value --, therefor.

In column 14, line 53, in Claim 18, after "module" delete "is".

Signed and Sealed this

Twenty-second Day of July, 2008

JON W. DUDAS
*Director of the United States Patent and Trademark Office*